United States Patent [19]
Jambor et al.

[11] Patent Number: 6,086,136
[45] Date of Patent: Jul. 11, 2000

[54] ROOF CONSTRUCTION FOR A MOTOR VEHICLE

[75] Inventors: Arno Jambor, Vaihingen; Oliver Wagner, Filderstadt, both of Germany

[73] Assignee: DaimlerChrysler AG, Stuttgart, Germany

[21] Appl. No.: 09/253,542

[22] Filed: Feb. 22, 1999

[30] Foreign Application Priority Data

Feb. 21, 1998 [DE] Germany .......................... 198 07 490

[51] Int. Cl.⁷ ..................................................... B60J 7/19
[52] U.S. Cl. ........................................................ 296/107.17
[58] Field of Search ........................................ 296/107.17

[56] References Cited

U.S. PATENT DOCUMENTS 4,776,630  10/1988  Fukutomi et al. .

FOREIGN PATENT DOCUMENTS 0482681   4/1992   European Pat. Off. .
917050    8/1954   Germany .
953229   11/1956   Germany .
19634510  1/1998   Germany .

Primary Examiner—Gary C. Hoge
Attorney, Agent, or Firm—Evenson, McKeown, Edwards & Lenahan, P.L.L.C.

[57] ABSTRACT

A roof construction for a motor vehicle is provided with a forward roof part, a rearward roof part having C-columns and having a rear window, and an adjusting device moving the two roof parts between a lowered inoperative position and a closed operative position. The adjusting device has a main hinge pin about which at least the rearward roof part can be swung. By way of a hinge pin, the rear window is hinged to the C-columns. One end of a drag lever is laterally linked in each case to the rear window, and its other end is disposed on the vehicle body side in a hinge axle. The hinge axle of the drag lever is situated at a distance from the main hinge pin.

16 Claims, 1 Drawing Sheet

ROOF CONSTRUCTION FOR A MOTOR VEHICLE

This application claims the priority of German patent application No. 198 07 490.5, filed Feb. 21, 1998, the disclosure of which is expressly incorporated by reference herein.

BACKGROUND AND SUMMARY OF THE INVENTION

The present invention relates to a roof construction for a motor vehicle having a forward roof part, a rearward roof part including C-columns and provided with a rear window, and having an adjusting device moving the two roof parts between lowered inoperative and closed operative positions. The adjusting device has a main hinge pin about which at least the rearward roof part can be swung.

A roof construction of this type is described in German Patent Document P 196 34 510.3. This roof construction, however, is disadvantageous in that the rear window has to be made relatively steep and in that a relatively large trunk volume is still required by the roof construction in its deposited condition despite the fact that the C-columns are moved to the front.

European Patent Document EP 0 482 681 B1 describes a roof having forward and rearward roof parts which are connected with one another by a hinge. The forward roof shell or the forward roof part is pushed into the rearward roof shell for depositing the roof. This means that the forward roof part, as a whole, must be narrower than the rearward roof part, which limits the shape and design of the roof construction.

The general state of the art is also apparent by reference to German Patent Documents DE-PS 917 050 and DE-PS 953 229.

It is an object of the present invention to provide a roof construction of the initially mentioned type which, by means of a simple adjusting device, can be deposited in the trunk space of the motor vehicle while saving as much space as possible.

According to the invention, this object is achieved by connecting the rear window by way of a drag bearing axis in a hinged manner with the C-columns. A drag lever is laterally linked at one end to the rear window. The other end of the drag lever is disposed on the vehicle body side in a hinge axle. The hinge axle of the drag lever is situated at a distance from the main hinge pin.

Since the rear window is connected with the C-columns in a hinged manner, the roof construction and the C-columns can be deposited separately when the roof construction is deposited. In this case, as a result of a drag lever according to the invention and the position of this drag lever, a turning-in movement of the rear window takes place during a roof lowering phase in which the roof is lowered into the hollow space between the C-columns and the forward roof part. In particular, if the forward roof part is constructed as a hardtop, then a clear enlargement of the useful trunk space volume takes place in this manner when the roof construction is deposited because the space below the deposited forward roof portion, which previously was lost, is better utilized.

The positions of the drag lever hinges, and particularly the position of the drag lever with respect to the main hinge pin, determine the extent by which the rear window is swivelled with respect to the C-columns during the lowering movement and arrives in the free space under the forward roof part. Because the hinge axle of the drag lever is spaced in front of the main hinge pin in the driving direction, when the roof is lowered, a relative movement of the drag lever occurs with respect to the C-columns.

Viewed as a whole, the adjusting device has a relatively simple construction and permits a simple operating mechanism.

Although a roof construction according to the invention is particularly suitable for hardtop constructions, it can also be used for softtops which have a firm rear window and which, as a result of the type of construction, have a hollow space between the deposited roof parts which cannot be utilized.

BRIEF DESCRIPTION OF THE DRAWINGS

Advantageous and further developments of the invention are apparent from the embodiments described in the following by way of the drawings.

DESCRIPTION OF THE PREFERRED EMBODIMENTS

Figure 1:
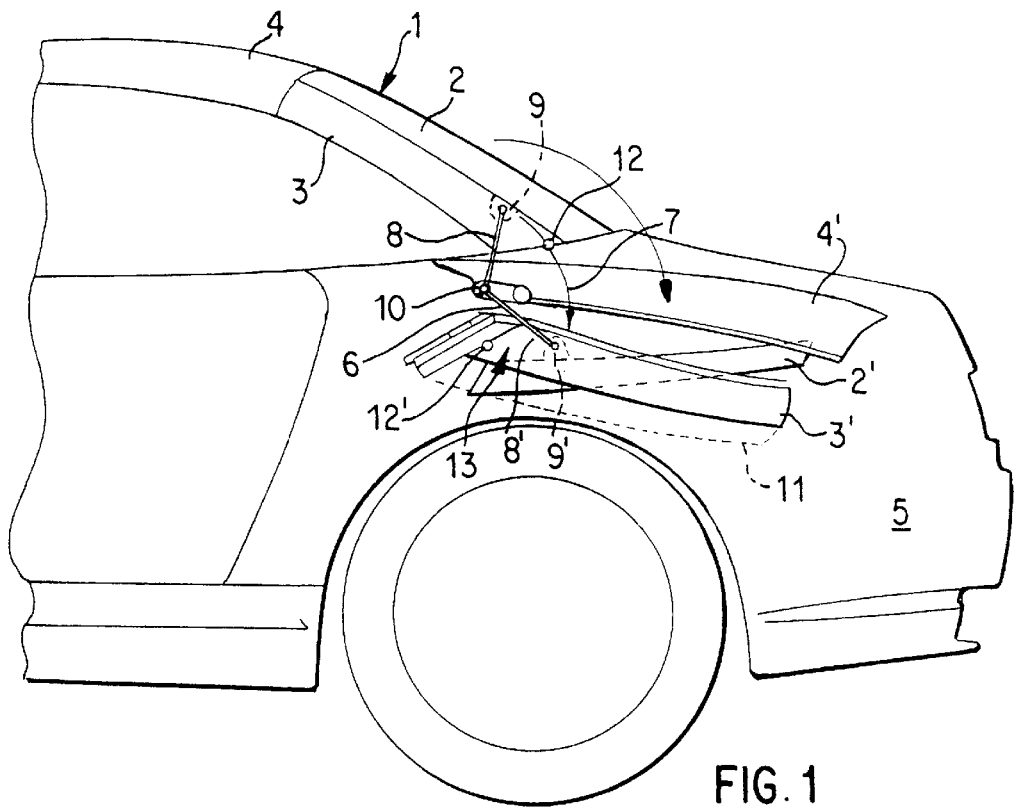
FIG. 1 is a lateral view of a first basic embodiment of a roof construction according to the invention.

The roof construction of a motor vehicle shown in FIG. 1 has a rearward roof part 1 with a firm rear window 2 and lateral C-columns 3. In a manner not shown in detail, a forward roof part 4 is tightly connected with the rearward roof part 1 and, together with the rearward roof part 1, can be deposited in a trunk space 5 of the motor vehicle. The adjusting device for depositing the roof construction has a main hinge pin 6 with which the rearward roof part 1 is connected in a manner which is known and therefore not described. During the depositing movement, the rearward roof part 1 is swivelled in the direction of the arrow 7 and each of the two C-columns 3 is deposited laterally in the trunk space 5. A drag lever 8 is linked by one end in the rearward area of the rear window 2 on each side to a linking point 9. The other end of the drag lever 8 is disposed in an articulated manner to a vehicle-body-fixed hinge axle 10.

As illustrated in FIG. 1, the hinge axle 10 is situated, in the driving direction, in front of the main hinge pin 6. It was found that a distance of approximately 40 to 60 mm is sufficient to achieve a corresponding relative movement of the rear window 2 with respect to the C-columns 3 during the depositing movement so that, in a forced manner, during swivel movement of the rearward roof part 1 in the direction of arrow 7 about the main hinge pin 6, the rear window 2' is swivelled into the hollow space below the deposited forward roof part 4'.

For simplification and better representation, FIG. 1 shows, in addition to the closed roof construction, the deposited positions of the forward roof part 4', of the C-columns 3' and of the rear window 2'. The broken line "11" indicates the position which the rear window 2' would take if, as is the case in the prior art, it were fixedly connected with the lateral C-columns 3'.

In order to achieve relative movement for swivelling in the rear window 2, with the restricted guidance provided by the drag lever 8, it is necessary to provide a drag bearing axis 12 between the C-columns 3 and the rear window 2, which is situated behind the linking point 9 of the drag lever 8. During the depositing movement of the roof construction, the rear window 2 will then swing with respect to the C-columns 3 in the direction of the arrow 13 about the drag bearing axis 12.

During the roof depositing movement about the main hinge pin 6, the C-columns 3 carry out a rotating movement about the main hinge pin 6 and, as a result, a relative movement occurs with respect to the hinge axle 10. This leads to the restricted drive and the turning-in movement of the rear window 2 with respect to the C-columns 3.

As the hinge axle 10 gets further away from the main hinge pin 6 in the driving direction, the swinging-in movement of the rear window 2 becomes stronger. In practice, it was found that generally a swinging movement of approximately 15° and a corresponding resulting distance are sufficient. In comparison to the position of the rear window 2' illustrated in FIG. 1 with respect to the broken line 11, the gain of trunk space volume and/or tank volume is clearly visible.

Figure 2:
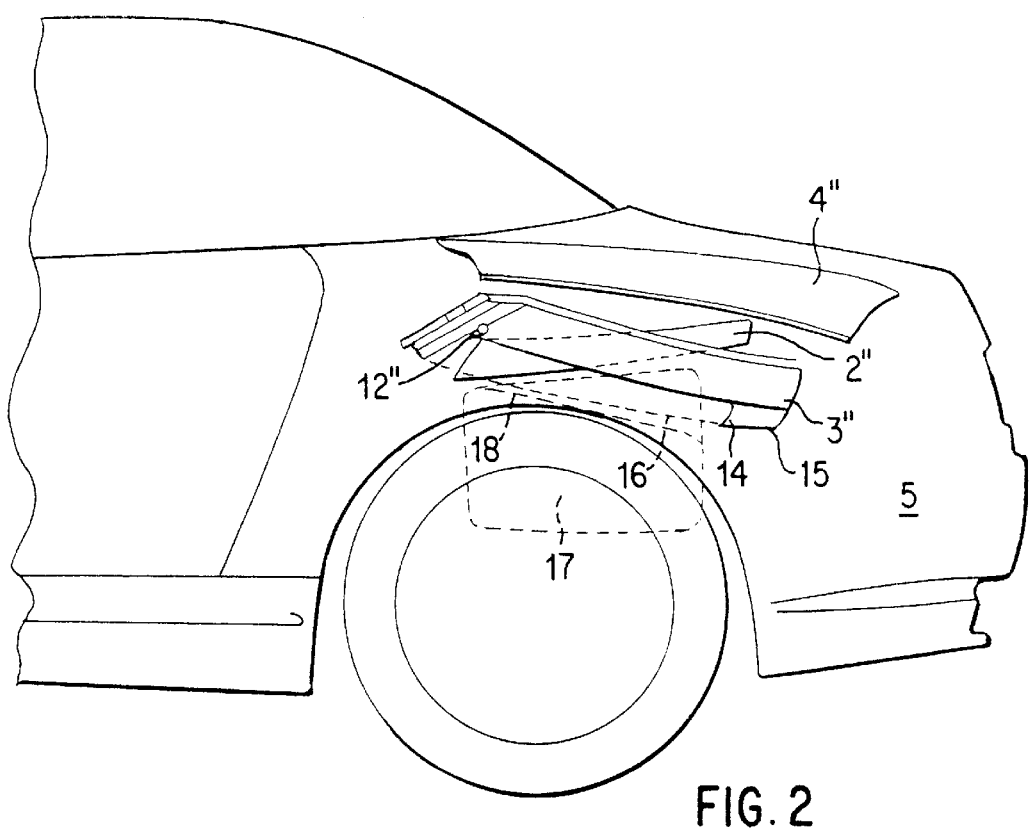
FIG. 2 is a view of another embodiment with a short rear window which does not extend along the whole length of a rearward roof part.

The embodiment illustrated in FIG. 2 is basically of the same construction as the embodiment described above and shown in FIG. 1. The adjusting device with the drag lever 8 and the depositing kinematics themselves have the same construction and operate in the same manner as those of the embodiment of FIG. 1 and, for reasons of simplification, are not illustrated in FIG. 2.

The single important difference in comparison to the embodiment according to FIG. 1 is that the rear window 2" does not project to the forward roof part 4". The rear window instead has a shorter construction and is in each case fitted into a setoff 14 of the C-columns 3". As a result of the setoff 14, an area is created at the C-columns 3" which is free of the rear window and is used as a transverse part 15 for transversely connecting the two lateral C-columns. The transverse connection is used for stabilizing and synchronizing the movement sequences.

FIG. 2 is a basic diagram of the roof construction only shown in the deposited position. The broken line 16 in FIG. 2 also shows the gain in space which, in this case, is used for enlarging a tank 17. As illustrated, the tank volume can be increased, starting from the broken line 18 to the broken line below the rear window 2", because each of the two C-columns 3" is situated laterally in the trunk space 5 where it has no disturbing effect.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Roof construction for a motor vehicle comprising:
    a forward roof part,
    a rearward roof part having C-columns and provided with a rear window,
    an adjusting device moving the forward and rearward roof parts between a lowered inoperative position and a closed operative position,
    a main hinge pin, about which at least the rearward roof part can be swung, included in the adjusting device, the rear window being connected by a drag bearing axis in a hinged manner with the C-columns,
    a drag lever in each case laterally linked by one end to the rear window, and
    a hinge axle by which the other end of the drag lever is disposed on a vehicle body side,
    wherein the hinge axle of the drag lever is situated at a distance from the main hinge pin.

2. Roof construction according to claim 1, wherein the drag lever is linked in a rearward area to a linking point of the rear window, the drag bearing axis being situated between the C-columns and the rear window behind the linking point in a driving direction.

3. Roof construction according to claim 1, wherein the rear window extends only along a partial length of the C-columns, and wherein the C-columns, in portions thereof not covered by the rear window, are connected with one another by a transverse part.

4. Roof construction according to claim 3, wherein the rear window is fitted into a setoff of each C-column and the transverse part adjoins the setoff.

5. Roof construction according to claim 1, wherein the adjusting device has a multi-part construction so that swinging movement can be adapted to installation conditions and other situations.

6. Roof construction according to claim 2, wherein the rear window extends only along a partial length of the C-columns, and wherein the C-columns, in portions thereof not covered by the rear window, are connected with one another by a transverse part.

7. Roof construction according to claim 6, wherein the rear window is fitted into a setoff of each C-column and the transverse part adjoins the setoff.

8. Roof construction according to claim 2, wherein the adjusting device has a multi-part construction so that swinging movement can be adapted to installation conditions and other situations.

9. Roof construction according to claim 3, wherein the adjusting device has a multi-part construction so that swinging movement can be adapted to installation conditions and other situations.

10. Roof construction according to claim 4, wherein the adjusting device has a multi-part construction so that swinging movement can be adapted to installation conditions and other situations.

11. Roof construction for a motor vehicle comprising:
    a forward roof part,
    a rearward roof part having columns and provided with a rear window,
    a main hinge pin about which at least the rearward roof part can be swung between inoperative and operative positions, the rear window being connected by a drag bearing axis in a hinged manner with the columns,
    a drag lever laterally linked by one end to the rear window, and
    a hinge axle by which the other end of the drag lever is disposed on a vehicle body side,
    wherein the hinge axle of the drag lever is situated at a distance from the main hinge pin.

12. Roof construction according to claim 11, wherein the drag lever is linked to a linking point of the rear window, the drag bearing axis being situated between the columns and the rear window behind the linking point in a driving direction.

13. Roof construction according to claim 11, wherein the rear window extends only along a partial length of the columns, and wherein the columns, in portions thereof not covered by the rear window, are connected with one another by a transverse part.

14. Roof construction according to claim 13, wherein the rear window is fitted into a setoff of each column and the transverse part adjoins the setoff.

15. Roof construction according to claim 12, wherein the rear window extends only along a partial length of the columns, and wherein the columns, in portions thereof not covered by the rear window, are connected with one another by a transverse part.

16. Roof construction according to claim 15, wherein the rear window is fitted into a setoff of each column and the transverse part adjoins the setoff.

* * * * *